United States Patent
Matsko et al.

(10) Patent No.: US 7,043,117 B2
(45) Date of Patent: May 9, 2006

(54) ELECTRO-OPTICAL MODULATION AND OTHER OPTICAL APPLICATIONS USING POLED OPTICAL WHISPERING GALLERY MODE RESONATORS

(75) Inventors: Andrey B. Matsko, Pasadena, CA (US); Vladimir Ilchenko, La Canada, CA (US); Lutfollah Maleki, Pasadena, CA (US); Anatoliy Savchenkov, La Crescento, CA (US)

(73) Assignee: California Institute of Technology, Pasadena, CA (US)

( * ) Notice: Subject to any disclaimer, the term of this patent is extended or adjusted under 35 U.S.C. 154(b) by 201 days.

(21) Appl. No.: 10/772,087

(22) Filed: Feb. 3, 2004

(65) Prior Publication Data

US 2004/0218880 A1 Nov. 4, 2004

Related U.S. Application Data

(63) Continuation of application No. 10/447,673, filed on May 28, 2003.

(60) Provisional application No. 60/444,432, filed on Feb. 3, 2003, provisional application No. 60/383,869, filed on May 28, 2002.

(51) Int. Cl.
*G02B 6/26* (2006.01)
*H01S 3/00* (2006.01)

(52) U.S. Cl. .............. 385/28; 385/27; 385/2; 385/8; 385/39; 385/40; 385/122; 385/146; 385/3; 359/346

(58) Field of Classification Search .............. 385/27, 385/28, 31, 14, 30, 2, 3, 8, 40, 41, 42, 122, 385/346; 359/346
See application file for complete search history.

(56) References Cited

U.S. PATENT DOCUMENTS

| 5,723,856 | A | 3/1998 | Yao et al. .............. 250/227.11 |
|---|---|---|---|
| 5,777,778 | A | 7/1998 | Yao ............................ 359/245 |
| 5,917,179 | A | 6/1999 | Yao .............. 250/227.11 |
| 5,929,430 | A | 7/1999 | Yao et al. .................... 250/205 |
| 6,138,076 | A | 10/2000 | Graf ............................ 702/14 |
| 6,389,197 | B1 | 5/2002 | Iltchenko et al. ............. 385/28 |
| 6,417,957 | B1 | 7/2002 | Yao ............................ 359/334 |
| 6,473,218 | B1 | 10/2002 | Maleki et al. .............. 359/245 |
| 6,476,959 | B1 | 11/2002 | Yao ............................ 359/334 |
| 6,487,233 | B1 | 11/2002 | Maleki et al. .............. 372/108 |
| 6,488,861 | B1 | 12/2002 | Iltchenko et al. ............. 216/24 |
| 6,490,039 | B1 | 12/2002 | Maleki et al. .............. 356/436 |
| 6,535,328 | B1 | 3/2003 | Yao ............................ 359/334 |
| 6,567,436 | B1 | 5/2003 | Yao et al. ..................... 372/32 |
| 6,580,532 | B1 | 6/2003 | Yao et al. .................... 359/111 |
| 6,594,061 | B1 | 7/2003 | Huang et al. ............... 359/239 |

(Continued)

FOREIGN PATENT DOCUMENTS

WO 0196936 12/2001 ............. 385/147 X

OTHER PUBLICATIONS

Cohen et al., "Microphotonic modulator for microwave receiver" Electronics Letters, vol. 37, No. 5, Mar. 1, 2001, pp. 300-301.

(Continued)

*Primary Examiner*—Brian M. Healy
(74) *Attorney, Agent, or Firm*—Fish & Richardson P.C.

(57) ABSTRACT

This application describes examples and implementations of optical devices and techniques based on use of whispering gallery mode (WGM) optical resonators that have nonlinear optical materials in multiple sectors where nonlinear coefficients of two adjacent sectors are oppositely poled.

31 Claims, 9 Drawing Sheets

U.S. PATENT DOCUMENTS

| | | | | |
|---|---|---|---|---|
| 6,762,869 | B1 | 7/2004 | Maleki et al. | 359/239 |
| 2002/0018611 | A1 | 2/2002 | Maleki et al. | 359/239 |
| 2002/0081055 | A1* | 6/2002 | Painter et al. | 385/2 |
| 2003/0012504 | A1 | 1/2003 | Iltchenko | 385/39 |
| 2003/0123780 | A1* | 7/2003 | Fischer | 385/15 |
| 2003/0185490 | A1 | 10/2003 | Lopes et al. | 385/16 |
| 2004/0218880 | A1* | 11/2004 | Matsko et al. | 385/122 |

OTHER PUBLICATIONS

Cohen et al., "Microphotonic millimeter-wave receiver architecture", Electronics Letters, vol. 37, No. 1, Jan. 4, 2001, pp. 37-39.

Ilchenko et al., "Whispering-gallery-mode electro-optic modulator and photonic microwave receiver", Optical Society of America, vol. 20, No. 2, Feb. 2003, pp. 333-342.

Ilchenko et al., "Sub-Micro watt photonic microwaver receiver", IEEE Photonics Technology Letters, vol. 14, No. 11, Nov. 2002, pp. 1602-1604.

Kawanishi et al., "Electrically tunable delay line using an optical single-side-band modulator", IEEE Photonics Technology Letters, vol. 14, No. 10, Oct. 2002, pp. 1454-1456.

Lu et al., "Wide-bandwidth high-frequency electro-optic modulator based on periodically poled liNbO$_3$", Applied Physics Letters, vol. 78, No. 8, Feb. 19, 2001, pp. 1035-1037.

Murata et al., "Quasi-velocity-matched LiTaO$_3$ guided-wave optical phase modulator for integrated ultrashort optical pulse generators", Electronics Letters, vol. 36, No. 17, Aug. 17, 2000, pp. 1459 1460.

Myers et al., Quasi-phase-matched optical parametric oscillators in bulk periodically poled LiNbO$_3$, J. Opt. Soc. Am. B, vol. 12, No. 11, Nov. 1995, pp. 2102-2116.

Schmuck, H., "Comparison of optical millimeter-wave system concepts with regard to chromatic dispersion", Electronics Letters, vol. 31, No. 21, Oct. 12, 1995, pp. 1848-1849.

Shimotsu et al., "Single side-band modulation performance of LiNbO$_3$ integrated modulator consisting of four-phase modulator waveguides", IEEE Photonics Technology Letters, vol. 13, No. 4, Apr. 2001, pp., 364-366.

Smith et al., "Technique for optical SSB generation to overcome dispersion penalties in fibre-radio systems", Electronics Letters, vol. 33, No. 1, Jan. 2, 1997, pp. 74-75.

Yonenaga et al., "A fiber chromatic dispersion compensation technique with an optical SSB transmission in optical homodyne detection systems", IEEE Photonics Technology Letters, vol. 5, No. 8, Aug. 1993, pp. 949-951.

Kuwata-Gonokami, M., "Laser Emission From Dye-Doped Polystyrene Microsphere", LEOS '93 Conference Proceedings, Lasers And Electro-Optics Society 1993 Annual Meeting, Nov. 1993, pp. 300-301.

Anderson, D.Z. et al., "Low-Order Whispering-Gallery Modes of a BaTi03 Disk", Summaries of Papers Presented at 1999 Conference on Lasers and Electro-Optics (CLEO '99), May 1999, pp. 541-542.

Lacey, S. et al., "Deformed glass Microsphere As A Three-Dimensional Chaotic Optical Microresonator", Summaries of Papers Presented at 2001 Quantum Electronics and Laser Science Conference (QELS '01 Technical Digest), May 2001, p. 65.

* cited by examiner

ELECTRO-OPTICAL MODULATION AND OTHER OPTICAL APPLICATIONS USING POLED OPTICAL WHISPERING GALLERY MODE RESONATORS

This application claims the benefit of U.S. Provisional Application No. 60/444,432 entitled "ELECTRO-OPTICAL MODULATION WITH PERIODICALLY POLED WHISPERING GALLERY MODE CAVITIES" and filed on Feb. 3, 2003.

This application is a continuation of U.S. patent application Ser. No. 10/447,673, pending, entitled "NONLINEAR OPTICAL WHISPERING GALLERY MODE RESONATORS" and filed on May 28, 2003. The U.S. patent application Ser. No. 10/447,673 itself claims the benefit from U.S. Provisional Application No. 60/383,869 filed on May 28, 2002.

The entire disclosures of the above referenced patent applications are incorporated herein by reference as part of this application.

STATEMENT REGARDING FEDERALLY SPONSORED RESEARCH

The devices, systems and techniques described herein were made in the performance of work under a NASA contract, and are subject to the provisions of Public Law 96-517 (35 USC 202) in which the Contractor has elected to retain title.

BACKGROUND

This application relates to modulation of light and other optical applications based on optical whispering-gallery-mode ("WGM") resonators.

Optical modulation is widely used in various applications such as optical communication and signal processing where light is modulated to carry certain information. Light may be modulated in amplitude or in phase. Electro-optical materials changes their refractive indices in response to applied electrical fields and hence may be used to modulate light.

Optical modulation may be implemented in WGM resonators. Examples for implementing optical modulation in WGM resonators may be found, e.g., U.S. Pat. No. 6,473,218. A dielectric material may be shaped to form a WGM resonator which supports a special set of resonator modes known as whispering gallery ("WG") modes. These modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, ranging from 1000 to 109 for quartz microspheres. Hence, optical energy, once coupled into a whispering gallery mode, can circulate within the WGM resonator with a long photon life time.

Such high Q values are generally difficult and expensive to obtain in conventional Fabry-Perot optical resonators formed with mirrors. The capability of producing high Q values makes the WGM resonators useful for optical modulation and other optical processes.

SUMMARY

This application describes, among others, various examples and implementations of optical techniques and associated devices that use poled nonlinear materials in optical whispering-gallery-mode ("WGM") resonators for optical modulation. In one implementation, the optical material of a WGM resonator includes a plurality of nonlinear sectors within the optical resonator and nonlinear coefficients of two adjacent sectors are oppositely poled to achieve a quasi phase matching condition. Such a WGM resonator may include at least part of a sphere or may have a non-spherical shape such as a spheroidal shape.

The poled sectors in the poled WGM resonators may be configured to provide a quasi phase matching condition for nonlinear mixing of three electromagnetic waves in various applications. The high Q factors of WGM resonators allow for efficient nonlinear wave mixing at a low threshold power. In some implementations, three optical waves may be non-linearly mixed to produce optical parametric oscillations. For example, an optical pump beam may be used to pump a properly poled nonlinear WGM resonator to produce an idler and a signal at wavelengths different from the pump wavelength. The idler and signal waves are supported in WG modes and may be at wavelengths different from each other in a nondegenerate mode or at the same wavelength in a degenerate mode.

Examples of optical modulation based on poled WGM resonators are described. In one implementation, a device includes an optical resonator and an electrical waveguide. The optical resonator is configured to support whispering gallery modes and includes sectors that are optically nonlinear and each exhibit an electro-optical effect. The nonlinear coefficients of two adjacent sectors are oppositely poled. The electrical waveguide is located relative to the optical resonator to guide an electrical oscillation signal into the optical resonator to spatially overlap with the whispering gallery modes and to modulate an index of the optical resonator via the electro-optical effect.

In another implementation, a method is also described in which an optical resonator is used to receive an input optical signal. The optical resonator has a geometry to support whispering gallery modes and includes sectors whose non-linear coefficients are oppositely poled between two adjacent sectors. The sectors each exhibit an electro-optical effect. An electrical oscillation signal is coupled into the optical resonator to spatially overlap with the whispering gallery modes and to produce an output optical signal having a modulation at a frequency of the electrical oscillation signal.

In yet another implementation, a device is described to include an optical resonator, an electrical waveguide, and means for coupling an input optical signal into the optical resonator and an output optical signal out of the resonator. The optical resonator is configured to support whispering gallery modes and includes a nonlinear optical material exhibiting a second-order nonlinear effect and an electro-optical effect. The nonlinear optical material includes sectors arranged in a quasi phase matching configuration for non-linear wave mixing of the input optical signal in a first whispering gallery mode, the output optical signal in a second whispering gallery mode, and an electrical oscillation signal spatially overlapping with the whispering gallery modes. The electrical waveguide is located relative to the optical resonator to guide the electrical oscillation signal into the optical resonator to spatially overlap with the whispering gallery modes and to modulate an index of the optical resonator.

These and other implementations are now described in greater detail in the following figures, the detailed description, and the claims.

DETAILED DESCRIPTION

Whispering-gallery modes (WGMS) in optical microcavities can provide attractive implementations of certain nonlinear optical effects because of their small mode volumes and high quality factors Q. Among various nonlinear optical effects, parametric nonlinear interactions among WG modes may be achieved in a nonlinear WGM cavity with a high efficiency if the WGM cavity that supports WGMs is fabricated from a low-loss nonlinear material. However, in various implementations, nonlinear parametric interactions are usually strongly forbidden by phase matching conditions due to the conservation of momentum of photons. This is because WGMs of a dielectric cavity that possess the rotational symmetry are orthogonal to one another in the momentum space. Under these circumstances, parametric interaction can occur when the symmetry of the system is broken or modified.

One of features of the nonlinear WGM resonators described here is to facilitate efficient nonlinear optical interactions of different WG modes. As one example, the nonlinear optical material of a WGM resonator may include multiple sectors within the optical resonator and nonlinear coefficients of two adjacent sectors are oppositely poled. The sectors may be symmetrically arranged with respect to a center of the optical resonator, or may be parallel stripes across the optical resonator. The following sections first describe various exemplary WGM resonator configurations suitable for implementing nonlinear WGM resonators and then describe specific examples of nonlinear WGM resonators and their applications, such as optical parametric oscillators, second harmonic devices, and electro-optical optical modulators.

Figure 1:
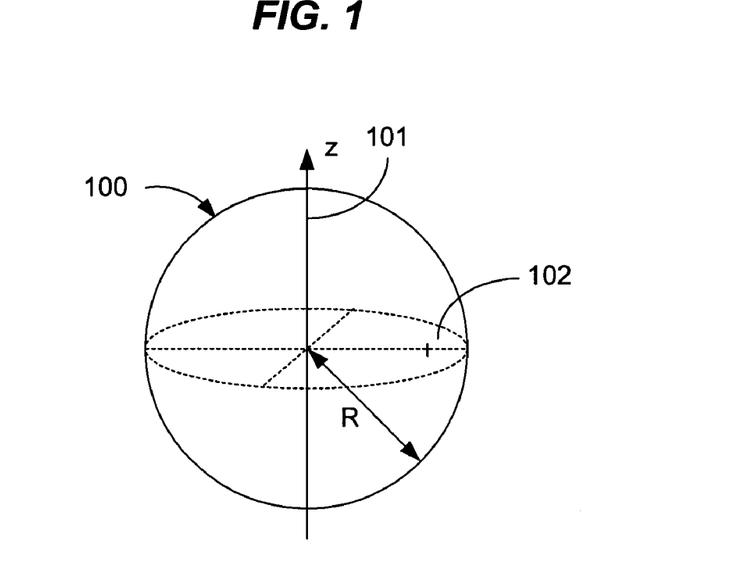
FIGS. 1, 2, 3, 4A, and 4B illustrate various exemplary resonator configurations that support whispering gallery modes and are formed from nonlinear optical materials.
Figure 2:
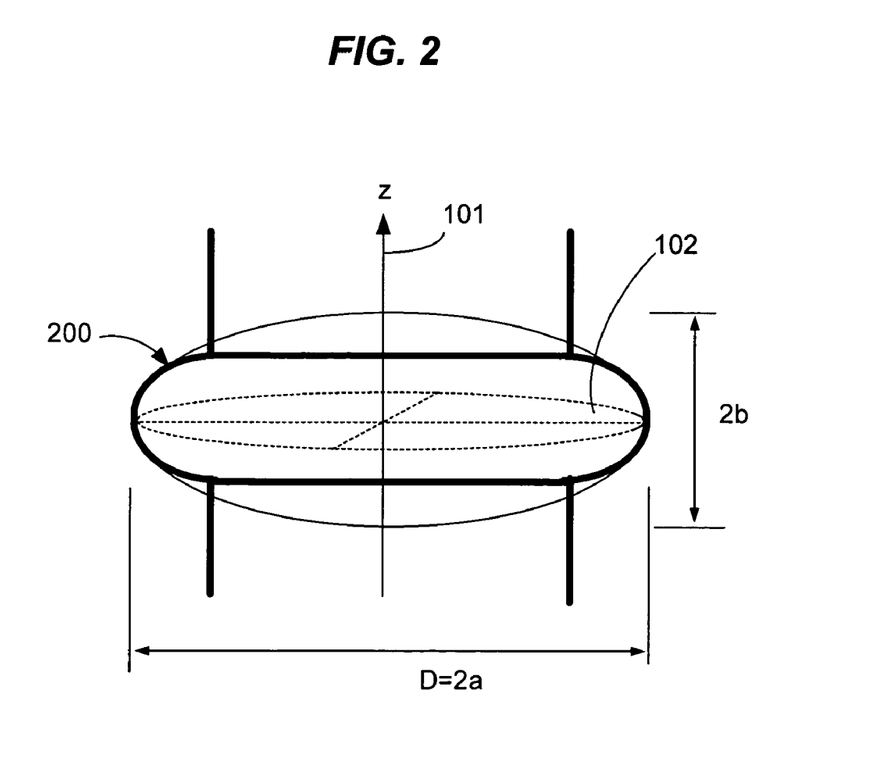
Figure 3:
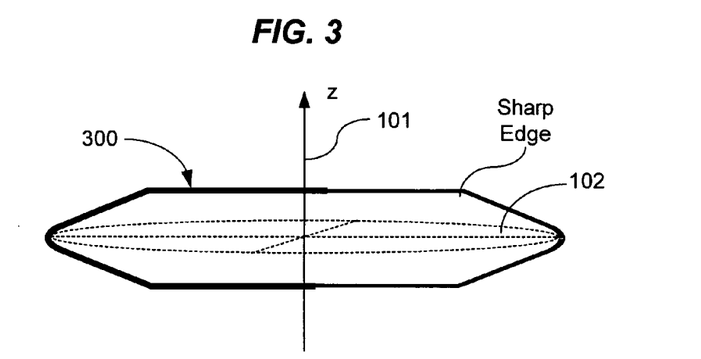

FIGS. 1, 2, and 3 illustrate three exemplary geometries for implementing the WGM resonators with nonlinear optical dielectric materials.

FIG. 1 shows a spherical WGM resonator 100 which is a solid dielectric sphere formed from a nonlinear optical material. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200 formed from a nonlinear optical material. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
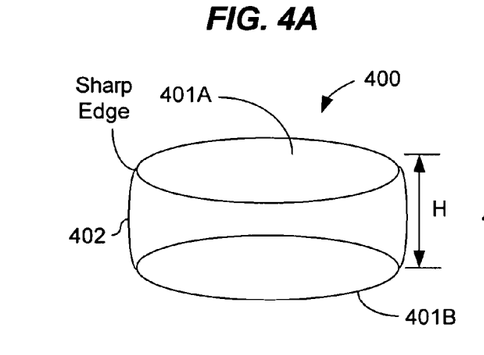
Figure 4B:
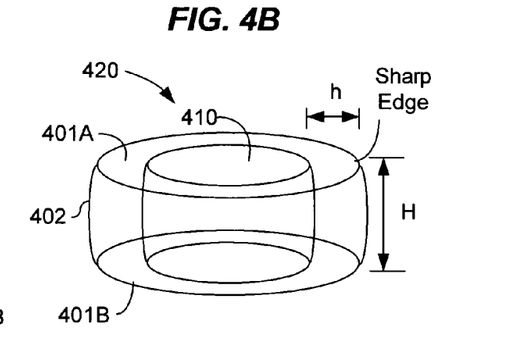

FIGS. 4A and 4B show a disk-shaped WGM resonator 400 and a ring-shaped WGM resonator 420, respectively, formed from nonlinear optical materials. In FIG. 4A, the solid disk 400 has a top surface 401A above the center plane 102 and a bottom is surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
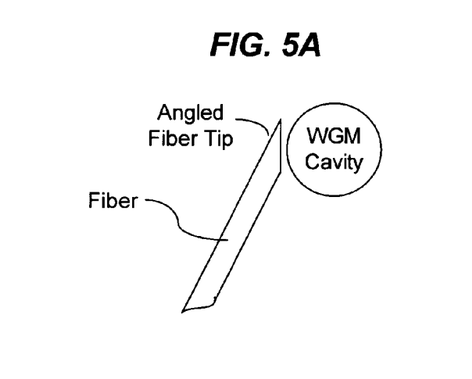
FIGS. 5A and 5B illustrate two exemplary evanescent couplers for a nonlinear WGM resonator.
Figure 5B:
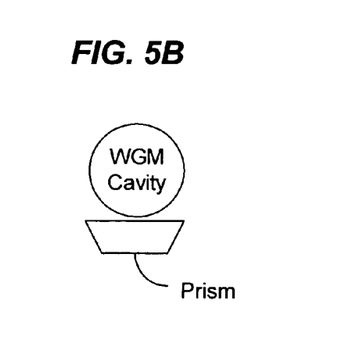

An optical coupler can be used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. FIG. 5B shows a micro prism as a coupler for the WGM resonator. Other evanescent couplers such as a coupler formed from a photonic bandgap material may be used. A single optical coupler may be used to couple one or more input signals into the nonlinear WGM resonator. Separate optical couplers may be used to respectively couple different input signals into the resonator. Optical coupling of an output signal from the resonator may be achieved by sharing an input coupler or by using a designated output coupler.

In WGM resonators with uniform indices, a part of the electromagnetic field of the WG modes is located at the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value.

The technical problems of creating efficient nonlinear optical wave mixing with whispering-gallery modes are caused by at least two sources: frequency-dependent dispersion of the host material of the dielectric cavity and dispersion introduced by the internal geometrical mode structure. WGMs of high orders may be understood in an analogy to dielectric optical waveguides. WGMs have dispersion that depends on geometry, similarly to waveguides. The frequency of a high-order TE WGMs may be estimated from the following equation:

$$\frac{2\pi R}{\lambda}\sqrt{\varepsilon(\lambda)} + \left[\frac{\varepsilon(\lambda)}{\varepsilon(\lambda)-1}\right]^{1/2} = v + \alpha_q\left(\frac{v}{2}\right)^{1/3} + \frac{3\alpha_q^2}{20}\left(\frac{2}{v}\right)^{1/3} + O(v^{-2/3}), \quad (1)$$

where $\lambda$ is the wavelength in vacuum; $v$ is the mode order; $\varepsilon(\lambda)$ is the susceptibility of the nonlinear material; R is the radius of the cavity; and $\alpha_q$ is the qth root of the Airy function $Ai(-z)$, which is 2.338, 4.088, and 5.521 for q=1, 2, and 3, respectively.

Equation (1) can be derived under the assumption that the cavity is a central part of a dielectric sphere or spheroid. As described above, because the main sequence of WGMs is localized close to the sphere equator it is possible to remove an unused part of the sphere to create a disk cavity without changing the mode spectrum. The angle distribution of the field is determined by $Y_{v,m}$ spherical functions with angular number $v$ and magnetic number m. For the main sequence of WGMs, it is assumed that m=v. The radial WGM profile for a spherical cavity is $\Psi(r)=J_{v+1/2}(kr)/r$, where $J_{v+1/2}(kr)$ is a Bessel function of the first kind and v=0, 1, 2, 3, . . . . The mode spectrum results from the boundary condition $\Psi(r)\rightarrow 0$ for $r\rightarrow\infty$ and 0. Equation (1) is valid for WGMs characterized by $v>>1$.

In fabrication of nonlinear WGM resonators, it may be difficult to directly cut a nonlinear material such as a crystal into a desired WGM resonator shape. Hence, in one implementation, it may be more practical to fabricate a nonlinear optical WGM cavity by polishing the rim of a dielectric cylinder cut from a crystal wafer. The rim of such a cavity may not necessarily be spherical to maintain high-Q and small volume WGMs. For example, the rim may be spheroidal or even conical in shape as discussed above. Calculation of the spectrum of an arbitrary dielectric spheroid can be complicated. However, Equation (1) may still be used for estimating the main mode sequence in a WGM spheroidal resonator.

For example, a commercial electro-optic nonlinear crystal in a form of a flat Z-cut $LiNbO_3$ substrate may be polished to form a spheroidal WGM resonator. In this configuration, the TE modes correspond to the extraordinary waves in the nonlinear material $LiNbO_3$. Consider a degenerate optical parametric oscillator (OPO) pumped at $\lambda_p=1064$ nm to generate signal and idler signals at a wavelength 2128 nm ($\lambda_s=\lambda_i$). Susceptibilities for the pump wave at 1064 nm, the signal wave at 2128 nm, and the idler wave at 2128 nm in WG modes in this Z-cut $LiNbO_3$ WGM resonator are $\varepsilon(\omega_p)=4.657$ and $\varepsilon(\omega_s)=\varepsilon(\omega_i)=4.513$, respectively. To achieve the desired phase matching condition for an efficient OPO in a bulk, congruent $LiNbO_3$, the crystal may include a series of periodic sectors along the directions of the signals where two adjacent sectors are poled to have opposite phases in their second-order nonlinear coefficients. This allows for a "quasi phase matching" condition. The desired poling periods for different sectors of $LiNbO_3$ satisfy the following quasi phase matching condition:

$$k_p - k_s - k_i - \frac{2\pi}{\Lambda} = 0, \quad (2)$$

where $k_p$, $k_s$, and $k_i$ are the wave vectors of the pump, the signal, and the idler optical signals, respectively. For the degenerate case, the poling period can be determined by $$\Lambda = \frac{\lambda_p}{\sqrt{\varepsilon_p} - \sqrt{\varepsilon_s}} \approx 31.67 \ \mu m. \quad (3)$$

A WGM cavity fabricated from the same Z-cut LiNbO$_3$ material under a quasi phase matching condition should have a different poling period than the above bulk design because of the dependence of the mode dispersion on the WGM cavity's geometrical parameters. In general, the smaller the WGM cavity, the shorter the period.

Figure 6:
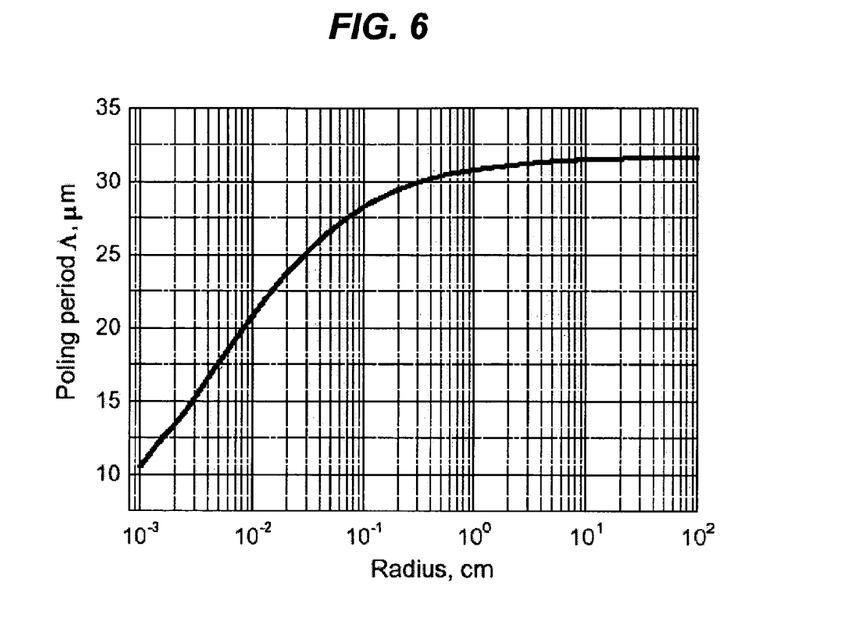
FIG. 6 shows the calculated poling period as a function of the radius of a nonlinear WGM resonator formed with a z-cut $LiNbO_3$ crystal, where the poling period decreases as the radius decreases.

FIG. 6 shows the calculated poling period of this WGM resonator as a function of the radius of the equator plane of the WGM resoantor. There is no guarantee that the pump and the signal frequencies are both resonant with the cavity WG modes. To characterize this possibility, the pump is assumed to be resonant with a cavity WG mode to determine the frequency detuning as follows:

$$\frac{\Delta}{\gamma_s} = \left| \frac{\omega_p}{\tilde{\omega}_s} - 2 \right| Q_s, \quad (4)$$

where $\gamma_s$ and $Q_s$ are respectively the half-linewidth and the quality factor of the signal mode, $Q_s = \omega_s/(2\gamma_s)$; $\tilde{\omega}_s$ is the frequency of the cavity WG mode that minimizes $\Delta$. If the condition of $\Delta/\gamma_s < 1$ is met, the signal frequency is said to be resonant with the cavity WG mode.

Figure 7:
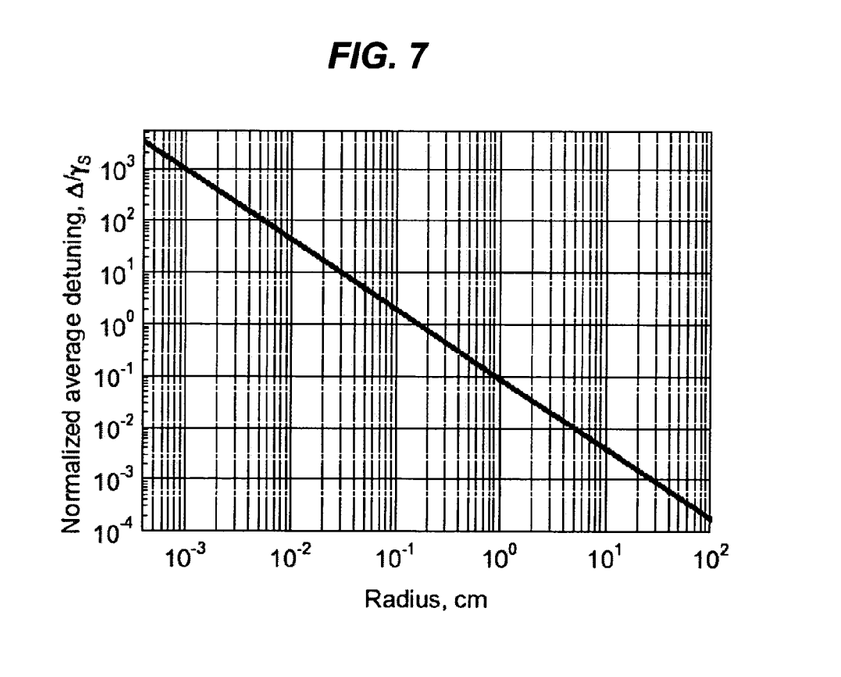
FIG. 7 shows calculated average detunings of the signal frequency from the nearest WG mode resonance frequency of a nonlinear WGM resonator formed with a z-cut $LiNbO_3$ crystal as a function of the resonator radius, where the pump field is at 1.064 µm and in resonance with a WG mode.

The dependence of the detuning on the WGM cavity radius in not simple. FIG. 7 shows the average dependence for $Q_s = 10^7$. The result in FIG. 7 suggests that the smaller the WGM cavity, the less the probability that it has both resonant frequencies $\omega_p$ and $\omega_p/2$. As shown in FIG. 7, the cavity radius should exceed 2 mm for this condition to be fulfilled. However, the condition $\Delta/\gamma_s < 1$ is not critical for smaller WGM cavities. The frequency difference may be compensated for by application of a DC bias electric field to the WGM cavity through proper electrodes formed on the LiNbO$_3$ WGM cavity to change the index of the crystal. This DC field moves modes of different frequencies in a different way to achieve the desired frequency matching in the system.

As a more specific example, consider a WGM cavity with a radius R of 0.64 mm to examine its main mode sequence for $\alpha_q = 2.338$ in Equation (1). The mode that is resonant with the pump field at 1064 nm has a mode index $v_p = 8156$. For the signal and idler modes at 2128 nm, the mode index is $v_s = v_i = 4004$. Because $v_p - v_s - v_i = 148 > 1$ there is no parametric interaction in the system unless the nonlinear index of refraction of the cavity material is modulated with the period determined by the number $v_x = v_p - v_s - v_i$. Modulation with period $v_x$ is indeed the basis for the result shown in FIG. 6, because $v_x/v_s$ increases as R decreases. This periodicity also results in phase matching for degenerate parametric frequency down conversion with pump radiation of 1.056 μm, 1.049 μm, 1.041 μm, and so on.

Figure 8:
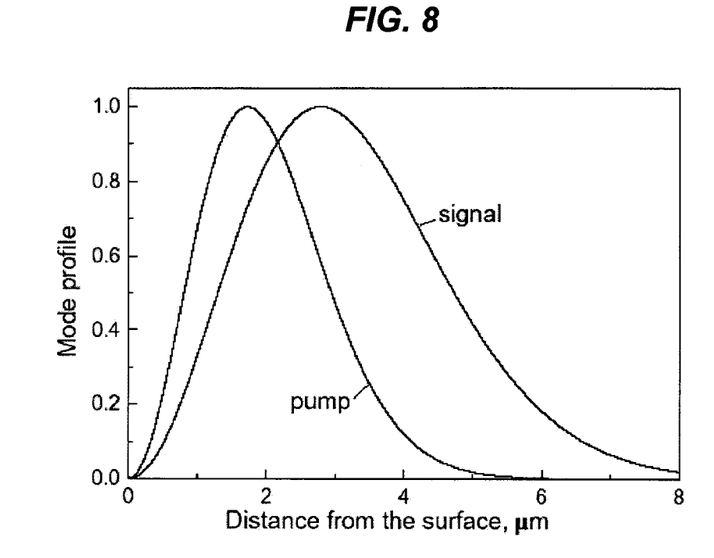
FIG. 8 shows spatial mode profiles inside a nonlinear WGM resonator for R=0.64 mm and pump wavelength at 1064 nm, where the zero coordinate corresponds to the cavity boundary and the evanescent filed outside the resonator is neglected in the computation for high-Q WGMs.

The approximate modulation period in this example is 27.3 μm. This periodic modulation in the WGM resonator may be achieved by periodic poling of the cavity material. FIG. 8 shows the mode profiles of the pump and signal beams in the OPO in the WGM resonator formed with the Z-cut LiNbO$_3$. The volumes of the pump mode, the signal-idler mode, and modes' overlap are $1.7 \times 10^{-7}$, $4 \times 10^{-7}$, and $1.5 \times 10^{-7}$ cm$^3$, respectively. The mode volumes can also be estimated by use of the asymptotic expression of $V_p \approx 2\pi R \times 2R(2\pi/v_p)^{1/2} \times (R/v_p^{2/3})$, where $2\pi R$ is the length of the cavity rim, $2R(2\pi/v_p)^{1/2}$ is the mode size in the Z direction, and $(R/v_p^{2/3})$ is the radial size of the mode. The optimization of the poled WGM resonator is specific to the pump wavelength. In this example, the radius of the spherical WGM resonator is 0.64 mm and the pump wavelength is 1064 nm.

The radius of the cavity is contained only in the ratio of $(R/\lambda)$ in Equation (1). Therefore the phase matching established by the periodic poling of the cavity material is stable with respect to the change in the radius, and the change in radius may be compensated for by fine tuning of the pump laser frequency.

The threshold for parametric oscillation in the above WGM cavity may be estimated as follows. The interaction energy between the pump and the signal modes may be written as $$v = \int \chi^{(2)} E_p E_s^2 dV, \quad (5)$$

where the second-order nonlinear coefficient $\chi^{(2)}$ varies with position in the WGM cavity, $E_p$ and $E_s$ are the pump and the signal mode amplitudes, respectively (where the signal mode coincides with the idler mode), and V is the volume of the WGM cavity. The mode amplitudes can be approximately expressed as follows:

$$E_p = \left( \frac{2\pi \hbar \omega_p}{\varepsilon_p V_p} \right)^{1/2} \Psi_p(r) \exp(i v_p \phi) a_p \exp(-i\omega_p t) + \text{adjoint}, \quad (6)$$

$$E_s = \sqrt{\frac{2\pi \hbar \omega_s}{\varepsilon_s V_s}} \Psi_s(r) \exp(i v_s \phi) a_s \exp(-i\omega_s t) + \text{adjoint}, \quad (7)$$

where $a_i$ and $a_i^\dagger$ (i=p, s) are annihilation and creation operators for the mode, $\Psi_p(r)$ and $\Psi_s(r)$ are the normalized mode spatial profiles such that $V_i = \int |\Psi_i(r)|^2 dV$ (i=p,s), $\omega_p$ and $\omega_s$ are the mode frequencies, and $\varepsilon_p$ and $\varepsilon_s$ are the susceptibilities of the material for the pump and the signal modes, respectively. It is assumed that the nonlinearity of the medium is modulated such that it has a Fourier component that matches the signal and pump modes:

$$\chi^{(2)} \rightarrow 2\tilde{\chi}^{(2)} \cos[(v_p - 2v_s)\phi].$$

Based on the above, the interaction Hamiltonian under the slowly varying amplitude and phase approximation can be expressed as the following:

$$H = \hbar g [(a_s)^2 a_p + a_p a_s^2], \quad (8)$$

where the coupling constant is $$g = 2\pi \omega_s \frac{\tilde{\chi}^{(2)}}{\varepsilon_s} \frac{V_{pss}}{V_s} \left( \frac{2\pi \hbar \omega_p}{\varepsilon_p V_p} \right)^{1/2}, \quad (9)$$

and $V_{pss} = \int \Psi_p \Psi_s^2 dV < V_p$, and $V_s$ is the mode overlap integral. Using this Hamiltonian, the equations of motion can be expressed as:

$$\dot{a}_p = -\gamma_p a_p - iga_s^2 + F_p, \quad (10)$$

$$\dot{a}_s = -\gamma_s a_s - 2iga_s a_p + F_s, \quad (11)$$

where $F_p$ and $F_s$ are the Langevin forces and $\gamma_p$ and $\gamma_s$ are pump and signal decay rates, respectively. The expectation value <Fp> describes the pumping from outside the system. The following expression can be derived $|F_p|^2/\gamma_p^2 = 4W_p Q_p/(\hbar\omega_p^2)$, where $Q_p = \omega_p/(2\gamma_p)$ is the mode quality factor and $W_p$ is the power of the pump radiation. Solving Eqs. (10) and (11) in a steady state and neglecting quantum fluctuations, the expectation value of the generated photon number for the signal is:

$$|a_s|^2 = \frac{\gamma_p \gamma_s}{2g^2}\left(\frac{2g}{\gamma_s \gamma_p}|\langle F_p\rangle| - 1\right). \quad (12)$$

This result leads to the following threshold condition for the parametric oscillation:

$$W_p \geq \frac{\varepsilon_p \varepsilon_s^2}{512\pi^3 [\tilde{\chi}^{(2)}]^2}\left(\frac{V_s}{V_{pss}}\right)^2 \frac{\omega_p V_p}{Q_s^2 Q_p}. \quad (13)$$

For realistic parameters $V_{pss}/V_s = 0.5$, $V_p = 2\times 10^{-7}$ cm$^3$, $\varepsilon_p = 4.6$, $\varepsilon_s = 4.5$, $\tilde{\chi}^{(2)} = 10^{-7}$ CGSE, $\omega_p = 2\times 10^{15}$ s$^{-1}$, $Q_s \cong Q_p \cong 10^7$, the threshold value is about 0.1 µW, which is orders of magnitude less than that of other OPO devices, e.g., 0.5 mW for similar wavelengths. This result suggests that that the toroidal WGM cavity is better than the total-internal-reflection cavity used in other OPOs pumped at 1064 nm. The oscillation threshold depends on the mode volume and the mode overlap integral. Hence, the mode volume may be reduced and the integral in WGM cavity may be increased to reduce this OPO threshold power.

Figure 9A:
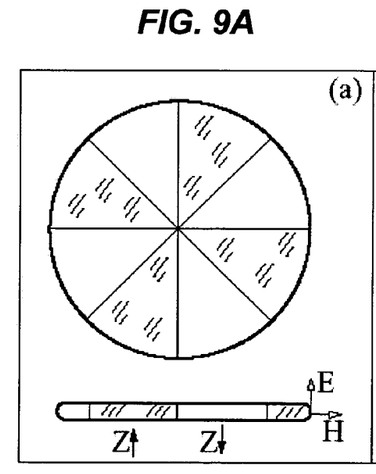
FIGS. 9A and 9B show two exemplary designs of the oppositely poled sectors in nonlinear WGM resonators.
Figure 10:
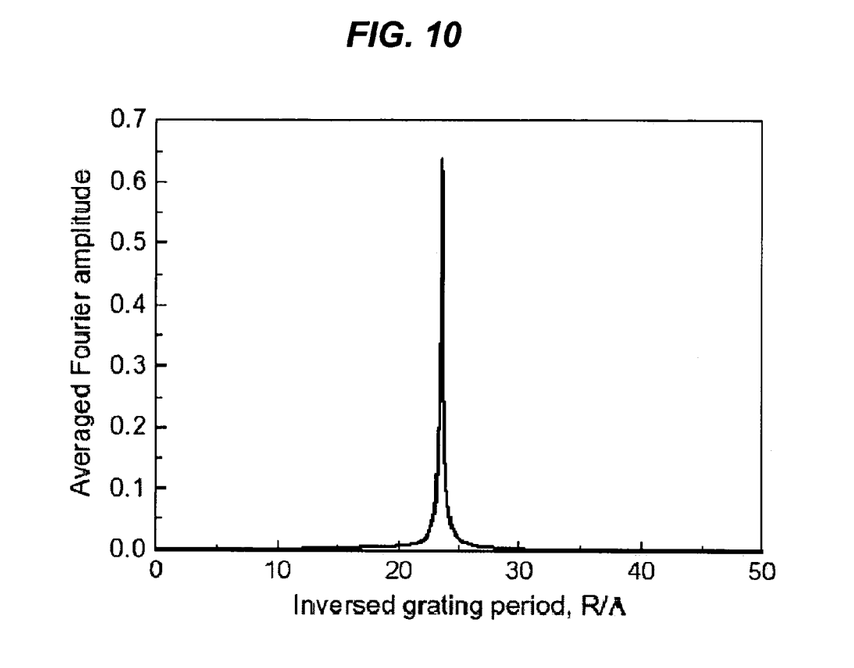
FIG. 10 shows the calculated envelope function for amplitudes of Fourier coefficients of the symmetrically arranged sectors in a nonlinear WGM in FIG. 9A for R=0.64 mm and pump wavelength at 1064 nm.

FIGS. 9A and 9B show two exemplary sector configurations for a nonlinear WGM resonator. FIG. 9A shows a first poling geometry which is symmetric with respect to the center of the cavity. Under this design, the nonlinear index coefficient is modulated with a periodic reversal of the sign of the second-order nonlinear coefficient and the corresponding Fourier coefficient for the first (fundamental) harmonic is $2/\pi$, as in a periodically poled bulk material under the quasi phase matching condition. FIG. 10 shows the dependence of the Fourier coefficients on the inverse poling period for the nonlinear WGM resonator in FIG. 9A, where the discrete spectrum is averaged and the envelope function is plotted as a function of the inversed grating period.

Figure 9B:
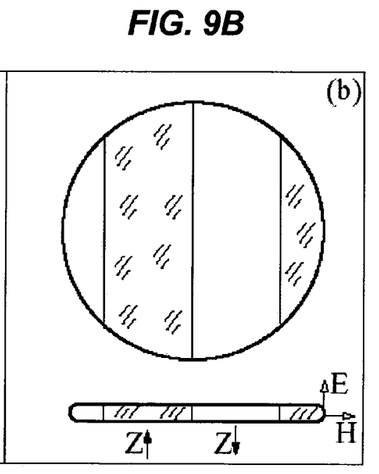

Fabrication of centrally symmetric poling as in FIG. 9A can be a difficult task. It may be economical to use a slice of commercially available periodically poled LiNbO$_3$ to form a WGM resonator. FIG. 9B shows one implementation of this resonator where the cavity has poled parallel stripe sectors instead of symmetric sectors. For such poling, a wave that travels close to the cavity surface sees a nonlinear grating with a changing period.

Figure 11:
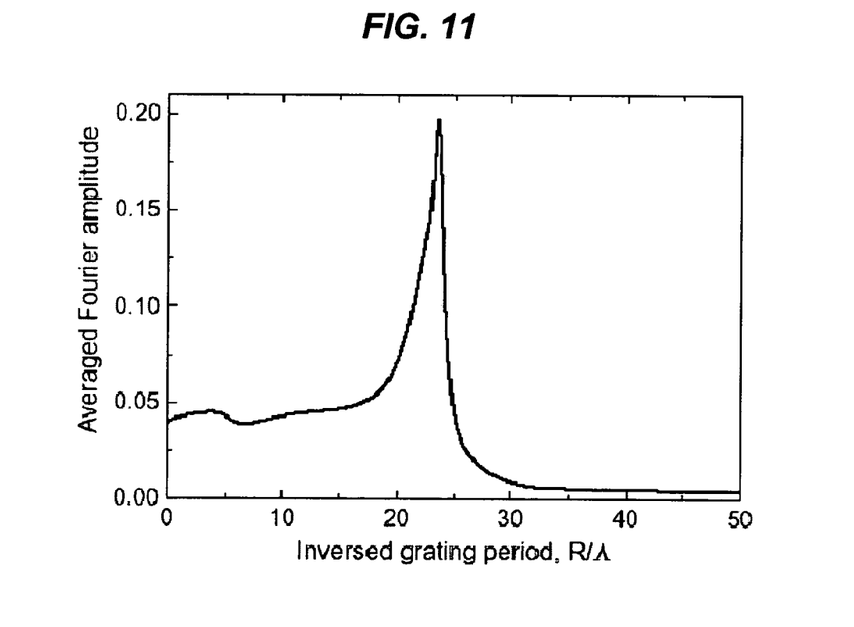
FIG. 11 shows the calculated envelope function for amplitudes of Fourier coefficients of the parallel stripe sectors in a nonlinear WGM in FIG. 9B for R=0.64 mm and pump wavelength at 1064 nm.

FIG. 11 shows an envelope function for the Fourier decomposition for the parallel stripe poling pattern in FIG. 9B. Because the grating does not have a fixed step with respect to the electromagnetic wave, the maximum Fourier component is less than the more efficient symmetric poling in FIG. 9A. As a result, the threshold power for the OPO in the resonator in FIG. 9B is higher than that of the resonator in FIG. 9A, e.g., by a factor of 11 in the specific example in FIG. 11. However, the spectrum of the grating is broad enough to simplify working with the cavity and to make possible multifrequency parametric oscillations in the system.

It is further contemplated that the parallel stripe poling may use nonequidistant poling stripes. Such nonequidistant poling stripes may create more-periodic poling and change the spectrum. Nonequidistant poling stripes and other complex poling structures may be implemented to achieve the desired quasi phase matching conditions.

Figure 12:
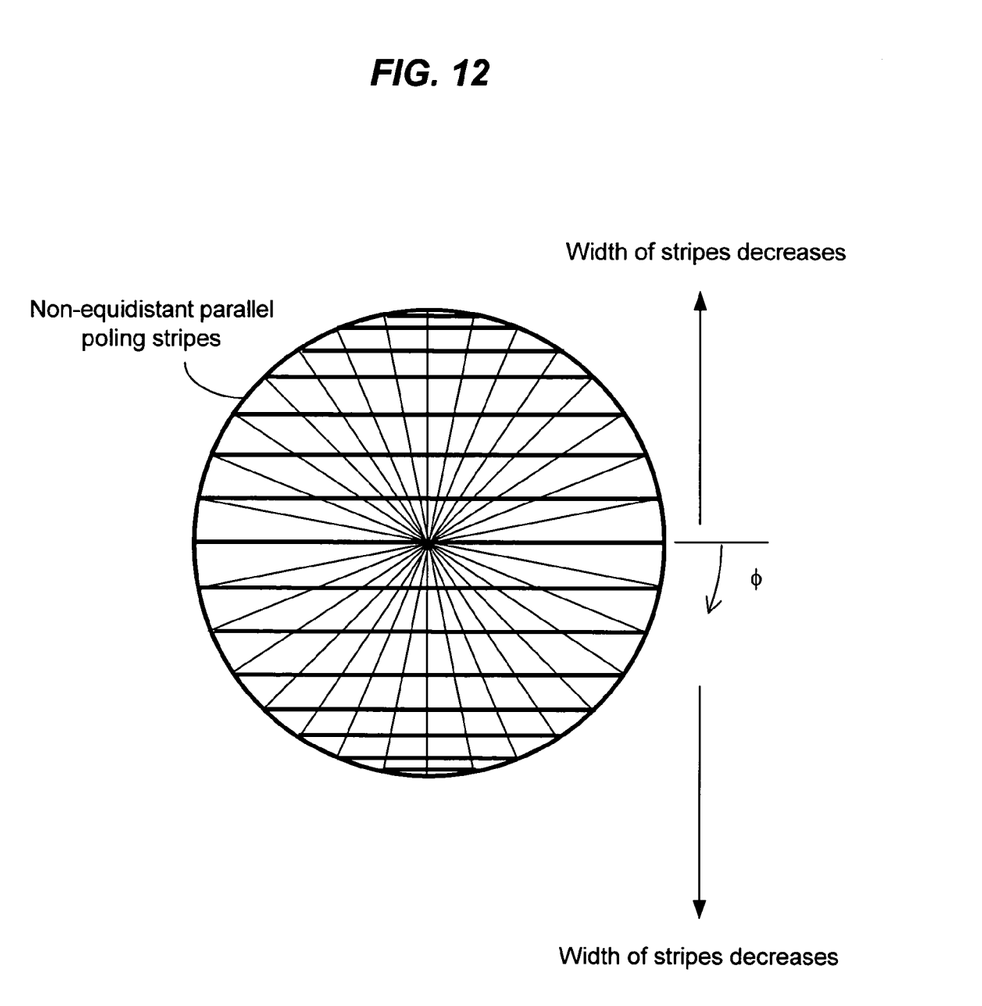
FIG. 12 shows one exemplary nonlinear WGM having non-equidistant parallel poling stripes.

FIG. 12 shows one exemplary nonlinear WGM having non-equidistant parallel poling stripes where the widths of stripes decrease from the center of the WDM to the outer edge of the WGM along the direction perpendicular to the poling stripes. In one implementation, the equator of the WGM may be divided into sections, e.g., with equal arc angles, to define the parallel poling stripes with varying widths. In particular, if the period changes as a function of sine, then poling period experienced by a WG mode may be effectively periodical because as the WG mode propagates around the periphery of the resonator. In FIG. 12, the thick parallel lines are domain boundaries between oppositely poled material and thin lines denote equal angular sectors.

Notably, nonlinear WGM resonators described here may also be used to produce nondegenerate parametric interactions. Because of the low threshold for the OPO operation, such a nonlinear WGM resonator may also be reversed and used as a detector of long-wavelength radiation by means of its direct upconversion into light. The maximum wavelength of the radiation is determined by the cavity size. To maintain low radiative losses, the order of the cavity mode should be sufficiently large. For example, for detection of radiation, the cavity should have a radius of at least 3.5 mm in some applications.

Hence, optical parametric oscillators and other nonlinear optical devices may be constructed based on the above and other poled nonlinear electro-optic WGM resonators. In one implementation, such a WGM resonator may include a nonlinear optical material to support whispering gallery modes. The nonlinear optical material includes multiple sectors within the optical resonator and nonlinear coefficients of two adjacent sectors are oppositely poled. For example, the nonlinear optical material may exhibit a second-order nonlinear optical effect such as LiNbO$_3$ or LiTaO$_3$. The poled sectors may have different arrangements. For example, the sectors may be symmetrically arranged with respect to a center of the optical resonator or are parallel stripes across the optical resonator.

In operation, an optical beam at a first wavelength may be coupled into the optical resonator to convert light at the first wavelength into light at a second, different wavelength. Various nonlinear optical effects may be achieved, including the second harmonic generation, parametric oscillation and amplification, and optical modulation based on a nonlinear optical effect. The conversion of light may include a second harmonic generation process where the second wavelength is one half of the first wavelength. The conversion of light may be a parametric oscillation process and another optical beam at a third wavelength is coupled into the optical resonator.

In the above examples of parametric oscillators, three electromagnetic waves (i.e., the pump, the idler, and the signal) are optical waves. When the idler wave is an electrical oscillation signal (e.g., a microwave or radio frequency signal) and the pump and the signal are two optical signals in different WG modes, poled WGM resonators may be formed by nonlinear electro-optical materials and may be operated to produce optical modulations from the modulations in the microwave or RF signals. Under proper conditions, it is possible to achieve the parametric interaction among running light-wave and microwave radiation in a poled WGM cavity as well as single-sideband electro-optical modulation by use of nonequidistant modes of a poled WGM cavity. In such devices, the nonlinear optical material for the WGM resonator exhibits an electro-optical effect and thus the index changes as the electric field changes. One or more electrodes may be formed on the WGM resonator to apply a control electrical signal as the idler wave to mix with the optical pump and the optical signals and to change the index. This change in the index causes modulation of the light produced by the nonlinear interaction based on the quasi phase matching condition. The control signal may co-propagate with the optical pump and signal waves in WGM modes to circulate around the WGM resonator.

Specific implementations of electro-optic modulators based on poled WGM resonators are described below.

Some communication applications require devices capable of receiving, transforming and processing signals in the millimeter wavelength domain. Electra-optic modulators (EOMs) based on electromagnetic wave interaction in non-linear WGM optical cavities may be used to construct devices to meet these and other needs in communications and other applications. Optical cavity-based WGM EOMs allow for reduction of microwave operating power compared with some modulators that do not use an optical cavity. The WGM modulators described here use a WGM cavity made with a second-order nonlinearity material, such as $LiNbO_3$ or $LiTaO_3$. Quality factors of WGMs may be large enough because of small optical losses in the materials. Even a small voltage applied across the area of confinement of the optical field can be sufficient to induce a change in the frequency of the WGM with a magnitude comparable to its linewidth. This forms the basis for an efficient modulation in the described examples.

The operation of electro-optic modulation in poled non-linear WGM resonators is based on three wave mixing in the nonlinear WGM resonators. The pump and signal waves are optical waves in WG modes of the cavity. The idler mode is an electrical oscillation signal, e.g., at a wavelength in a millimeter range and the idler needs a metal waveguide system to be confined in the interaction region of the optical cavity where the WG modes are present. To achieve the modulation, the cavity is optically pumped to have a pump wave in a WGM mode while the electrical oscillation signal (e.g., a microwave radiation) being simultaneously sent into the system. The efficient optical-microwave interaction may occur when the frequency difference or sum of the optical and microwave pumping coincides with resonant frequency of another, signal, WGM mode. Such an interaction, however, may be forbidden by the phase matching conditions.

In the examples described below, poled nonlinear optical WGM cavity may be used to provide a quasi phase matching condition to allow for the nonlinear interaction. For example, periodical poling of the second-order nonlinear coefficient $\chi^{(2)}$ of the nonlinear materials may be used for fabrication of WGM EOMs. A traveling wave EOM has easier tunability than a standing wave modulator. Disadvantage of the traveling wave WGM EOM compared with WGM EOM utilizing microwave resonator is absence of accumulation of the microwave power in the interaction region and, hence, weaker modulation for the same values of the microwave pump power sent to the system.

Periodically poled materials can provide quasi-phase matching for light modulation. Domain reversal period $\Lambda$ for a phase matching between light and microwaves in a planar geometry is similar to Eq. (2):

$$\frac{2\pi}{\Lambda} = \frac{\omega_M}{c}\left(\sqrt{\varepsilon_M} - \sqrt{\varepsilon_P}\right) + \frac{\omega_S}{c}\left(\sqrt{\varepsilon_S} - \sqrt{\varepsilon_P}\right), \quad (18)$$

where it is assumed that $\omega_p = \omega_s + \omega_M$, $\omega_p$ and $\omega_s$, are frequencies of optical pumping and signal, $\omega_M$ is the microwave frequency; $\varepsilon_p$, $\varepsilon_S$, and $\varepsilon_M$ are the pump, signal, and microwave susceptibilities of the medium. Eq. (18) may also be written as follows:

$$\Lambda = \frac{2\pi}{\omega_M} \frac{1}{\frac{1}{v_m} - \frac{1}{v_g}}, \quad (19)$$

where $v_m = c/\sqrt{\varepsilon m}$ is the phase velocity of microwaves, $v_g$ is group velocity for the light. To derive this expression we assumed that $\omega_p \cong \omega_S \gg \omega_M$.

The group velocity for the light travelling in WGM cavity may be estimated from Eq. (1). In this regard, an analogy between WGM and a mode of a ring fiber cavity is used to simplify the computation. For such a cavity, the following expression can be written:

$$\frac{2\pi R}{\lambda}\sqrt{\varepsilon_f(\lambda)} = v \quad (20)$$

where $\varepsilon_f(\lambda)$ is an effective susceptibility of the fiber that takes into account both material and geometrical dispersions of the fiber. The group velocity may be introduced as $$\frac{\omega_v + 1}{c}\sqrt{\varepsilon_f(\omega_v + 1)} = \frac{\omega_v}{c}\sqrt{\varepsilon_f(\omega_v)} + \frac{1}{v_g}(\omega_{v+1} - \omega_v), \quad (21)$$

where $\omega_v = 2\pi c/\lambda v$. Comparison of Eqs. (20) and (21) provides $$v_g = R(\omega_{v+1} - \omega_v) \quad (22)$$

Neglecting material dispersion, an expression can be derived for an effective group velocity for the main WGM sequence:

$$v_g \approx \frac{c}{\sqrt{\varepsilon_p}}\left[1 + \frac{0.62}{v_p^{2/3}}\right]. \quad (23)$$

The group velocity can be a little bit larger than the phase velocity because the wave with larger frequency has a longer round trip path. We may neglect by the dependence of the group velocity on the mode order for large $v_p$ we are interested in, and rewrite Eq. (19) as $$\Lambda = \frac{2\pi}{\omega_M} \frac{c}{\sqrt{\varepsilon_M} - \sqrt{\varepsilon_p}}. \qquad (24)$$

Assuming that $\sqrt{\varepsilon_M} \approx 4.2$, $\sqrt{\varepsilon_p} \approx 2.1$ ($\lambda_p = 1.55$ μm), and $\omega_m = 2\pi \times 100$ GHz, it can be computed that $\Lambda = 0.15$ cm. It is worth noting that the value of $\sqrt{\varepsilon_M}$ varies depending on the microwave waveguide properties.

In some implementations for comparably low modulation frequency, no periodical poling may be necessary. Without periodical poling the optimum interaction length for the light and microwaves is $\Lambda/2$, where $\Lambda$ is determined by Eq. (24). For example, in a sub-micro watt photonic microwave receiver using a WGM cavity of R=2.3 mm and $\omega_M = 2\pi \times 10$ GHz, the interaction region is 0.75 cm long, which is approximately a half of the WGM cavity rim length. The periodical poling becomes important if a modulation with a higher frequency in the same large cavity is desirable.

Figure 13A:
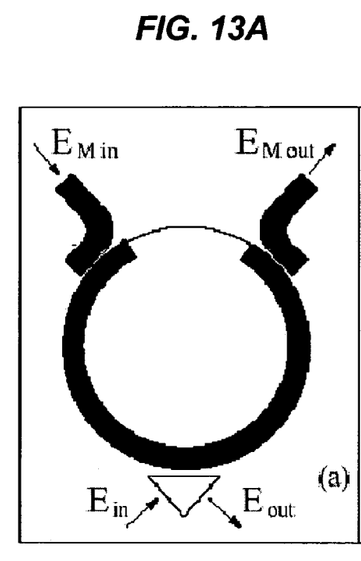
FIGS. 13A and 13B illustrate one example of an electro-optical modulator using a poled WGM resonator.
Figure 13B:
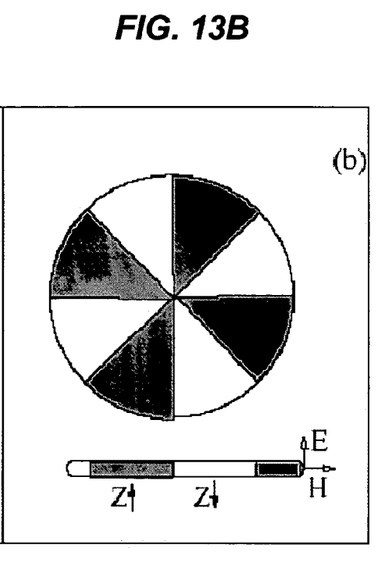

FIGS. 13A and 13B show one example for a traveling wave WGM EOM. Light is sent into a spheroid optical cavity fabricated from a Z-cut periodically poled LiNbO$_3$ substrate via a coupling diamond prism. The side-wall of the disc cavity is polished such that the cavity becomes a part of an oblate spheroid. The optical cavity is placed between two conductive plates forming a microwave waveguide that is pumped with an external microwave source. The conductive plates in this example are shown to be stripe electrodes on the edge of the optical cavity where the WG modes are present. So the electrical oscillation signal guided by the waveguide spatially overlaps with the optical WG modes and interact with the optical pump and signal waves. In one implementation, when the microwave frequency corresponds to the free spectral range of the WGM cavity and poling period of the LiNbO$_3$ is properly adjusted to sustain phase matching of the light and microwaves, the parametric interaction between input monochromatic light and microwaves occurs. Optical sidebands are generated and the outgoing light is modulated.

FIG. 13B illustrates an exemplary poling structure to achieve interaction between the main sequence of WGMs with the microwaves. Other poling structures, e.g., examples in FIGS. 9B and 12, may also be used.

The above exemplary modulator may be designed to generate symmetric sidebands shifted from the carrier frequency of the input light on the value of the frequency of the microwave pump. This double sidebands on two opposite sides of the carrier are due to a symmetry of the system. The main sequence of the WGMs is almost equidistant in a large enough cavity. Generally, each pair of the neighboring optical modes from the main sequence are phase matched with the microwaves if at least one set of pump-signal-idler is phase matched.

Generation of a single modulation sideband shifted from the carrier frequency is sometimes useful in various applications such as photonics applications. Examples include high density wavelength multiplexing and long haul fiber transmission. When a double sideband signal is sent through a fiber, dispersion of the fiber causes each spectral component of the signal to experience different phase shifts. The value of the shifts depend on the transmission distance, modulation frequency, and dispersion properties of the fiber. This effect results in transformation of the amplitude modulated light into phase modulated light and vice versa. Hence, the presence of the sidebands on two sides of the carrier can significantly complicate the processing of the received signal. In a single sideband signal transmission, this problem is not so stringent.

Properly poled WGM resonators may be used to produce single sideband modulators (SSB) using nonequidistant modes of a WGM cavity, which generally possess a large variety of modes. In a spherical cavity there are nonequidistant radial modes. The main sequence of those modes is determined by different numbers of q for the Airy function in Eq. (1).

Figure 14:
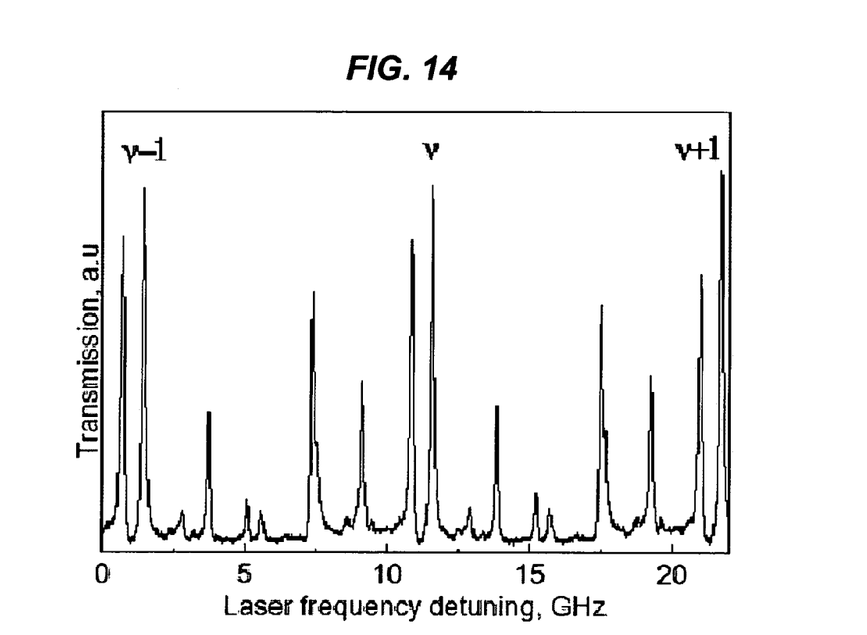
FIG. 14 shows a measured spectrum of an exemplary toroidal lithium notate cavity, where the main, nearly equidistant WGM sequence is for v, q=1, and l=1.

In an ideal dielectric sphere, many WG modes are degenerate. Changing the shape of the cavity to a non-spherical spheroid results in lifting of the azimuthal degeneracy and appearance of nonequidistant spectrum. A sample of experimental spectrum of 4.6 mm in diameter LiNbO$_3$ oblate spheroid cavity is shown in FIG. 14 where nonequidistant modes are present. When such a spheroid is utilized for light modulation, microwave radiation, resonant with two WGMs, might be off-resonant with the other relevant WGMs because of strong nondegeneracy of the spectrum and. Under this condition, only a single sideband generation is possible.

Figure 15:
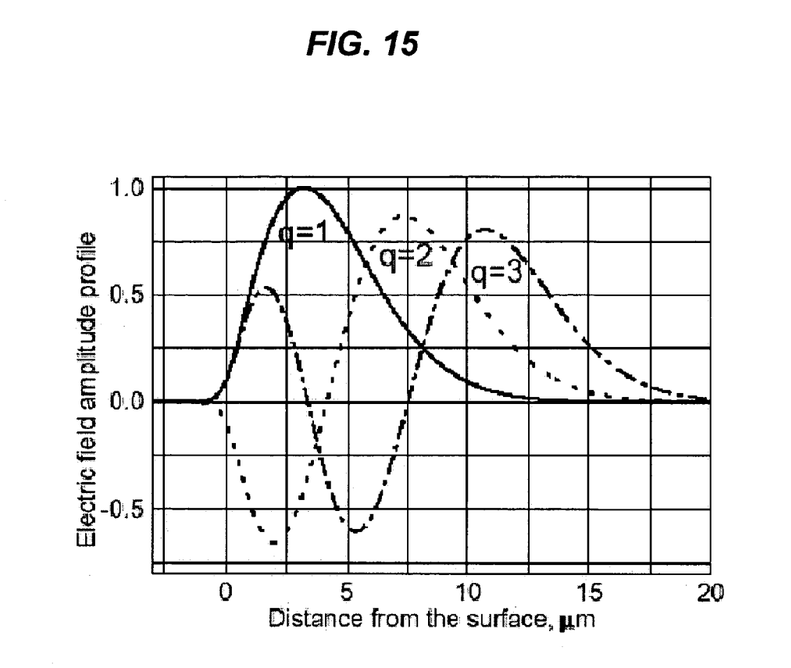
FIG. 15 shows amplitude profiles of WGMs with different values of q.

The WG modes in a WGM resonator are orthogonal in space and overlap geometrically. FIG. 15 shows wavefunctions for WG modes with q=1, 2, and 3. Proper poling, including periodical and non periodical poling, may break the orthogonality of the WG modes and thus permit interaction between optical WG modes with microwaves. The interaction energy between the optical pump, optical signal and the microwave idler modes is similar to Eq. (5) and reads $$v = \int_V \chi^{(2)} E_P E_S E_M \, dV, \qquad (25)$$

where $\chi^{(2)}$ is varying in space nonlinearity of the cavity, $E_p$, $E_S$, and $E_M$ are the pump, signal, and microwave mode amplitudes, V is the volume of the cavity.

Referring back to FIGS. 1 and 2, and Eq. (1), the orthogonality of the WG modes exists in all three dimensions, e.g., the z direction perpendicular to the equator plane 102, the radial direction within the equator plane 102, and the horizontal azimuth angular direction within the plane 102. Hence, based on Eq. (25), if the poling of the nonlinear material for the WGM resonator can destroy the orthogonality of the WG modes in at least one direction of the three directions, the interaction of the three fields in Eq. (25) will not be zero and hence two different WG modes are coupled through the 3-wave mixing. In Eq. (1), the mode parameter q is originated from the Airy function and thus represents the spatial distribution of WG modes along the radial direction. The mode order $\nu$ represents the spatial distribution of WG modes in the azimuth angular direction in the equator plane 120. Hence, a poling structure can be designed to change the spatial pattern of the nonlinear coefficient $\chi^{(2)}$ in one or more of these three directions to break the orthogonality of the WG modes and to achieve a coupling of two selected WG modes for optical modulation.

Referring back to FIGS. 9A and 13B, the poling structure changes the spatial distribution of the nonlinear coefficient $\chi^{(2)}$ along the azimuth angular direction and the orthogonality of the WG modes. Hence, two WG modes are no longer orthogonal in all directions and can couple with each other to produce the optical modulation. Two WG modes with different values for the mode parameter v may be coupled with each other through the wave mixing with the microwave.

For two WGM modes with indices $(v_1,q_1)$ and $(v_2,q_2)$, a corresponding geometrical two-dimensional poling structure may be designed to support the coupling of the WG modes and the microwaves, resonant with the modes' beatnote. For example, the parallel stripe poling patterns in FIGS. 9B and 12 break the orthogonality in both the radial and the azimuth angular directions to produce the desired nonlinear optical coupling between two WG modes. Hence, two WG modes with different combinations of (v, q) may be coupled to cause the optical modulation.

Figure 16A:
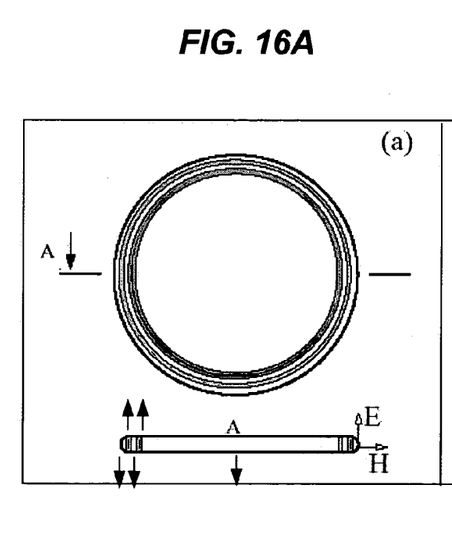
FIGS. 16A, 16B, 17A, and 17B show four different poling patterns for lithium niobate resonators that allow for interaction of two different WGMs and a microwave field.

FIG. 16A shows a periodical poling of lithium niobate along the radial direction in the WGM resonator with a "circular chess structure" to allow for coupling between two WG modes with different values of q and the microwave field. The lower part in FIG. 16A shows the side view and the upper part shows the top view of the cavity. Since the WG modes are primarily present in the peripheral edge of the resonator, the radial poling pattern may be made only near the peripheral edge of the resonator. A microwave waveguide or resonator may be specially shaped to spatially overlap the microwave with the WG modes and to provide the phase matching with the microwave.

Figure 16B:
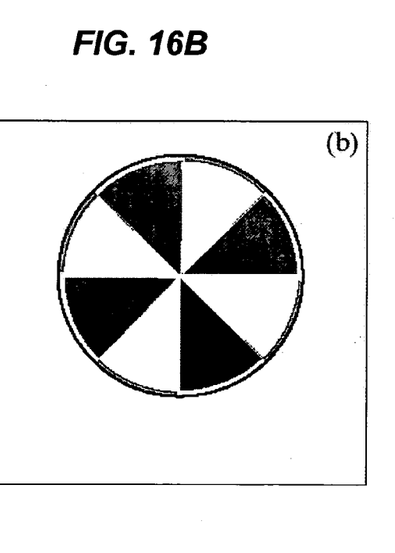

One of the features of a poled WG resonator modulator based on interaction of modes with different values in q is that the light exits the modes through an optical coupler (e.g., a coupling prism) with slightly different angles. It is possible to spatially separate the generated sideband and the carrier, similarly to some acousto-optical modulators. In addition, the efficiency of the interaction can be guarantied by almost the same high quality factors of modes with small values of q FIG. 16B shows a periodically poled cavity that may be used to provide the desired quasi phase matching in a traveling wave modulator. This poling pattern is two dimensional and combines the radial poling in FIG. 16A and the azimuth angular poling in FIG. 9A.

Nondegenerate WG modes with the same v and q, but different azimuthal numbers l are orthogonal in space. The WG modes with different l are responsible for less pronounced resonances in FIG. 14. The modes interact with microwaves if the WGM dielectric cavity is fabricated from two crystal wafers with alternating directions of the crystal axis along the z direction.

Figure 17A:
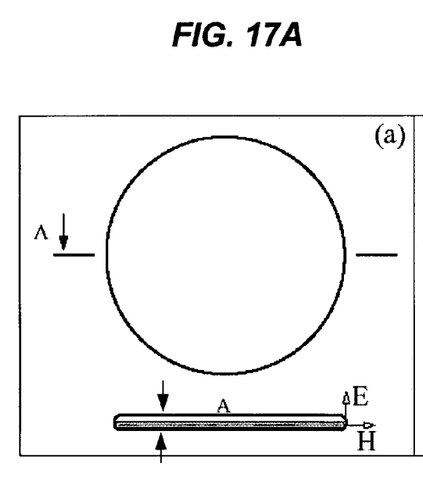
Figure 17B:
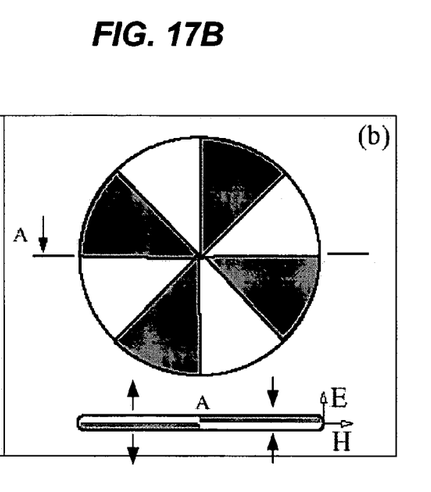

FIGS. 17A and 17B illustrate two examples of this poling structure. In FIG. 17A, the cavity includes a two layers of nonlinear optical materials that stacked over each other along the z direction 101 shown in FIGS. 1 and 2. The two layers are poled in opposite directions to allow for coupling of two WG modes with different azimuth mode parameter l. For any modes with arbitrary $l_1$ and $l_2$ it is possible to design a sequence of slices of the crystal to achieve interaction of the light with microwaves. Matching between group velocity of the light and the phase velocity of the microwaves may be created via designing the microwave resonator or waveguide. FIG. 17B shows a poling structure that combines the poling patterns in FIGS. 17A and FIG. 9A.

Hence, a whispering-gallery-mode dielectric cavity with a periodically poled nonlinear material may be designed to have an appropriate periodic poling for compensation for the phase mismatch among cavity modes caused by cavity material dispersion and geometrical cavity dispersion. The potential high-quality factors and small volumes of the WG modes in such resonators may be used to create ultra low-threshold optical parametric oscillators, electro-optic modulators, and other devices.

Although only a few implementations are disclosed, it is understood that variations and enhancements may be made.

What is claimed is:

1. A device, comprising:
   an optical resonator configured to support whispering gallery modes and comprising a plurality of sectors that are optically nonlinear and each exhibit an electro-optical effect, wherein nonlinear coefficients of two adjacent sectors are oppositely poled; and
   an electrical waveguide located relative to the optical resonator to guide an electrical oscillation signal into the optical resonator to spatially overlap with the whispering gallery modes and to modulate an index of the optical resonator via the electro-optical effect.

2. The device as in claim 1, wherein the optical resonator is a whole sphere.

3. The device as in claim 1, wherein the optical resonator comprises a portion of a whole sphere.

4. The device as in claim 1, wherein the optical resonator has a non-spherical shape.

5. The device as in claim 4, wherein the optical resonator has a spheriodal shape.

6. The device as in claim 1, wherein the optical resonator has a disk shape.

7. The device as in claim 1, wherein the optical resonator has a ring shape.

8. The device as in claim 1, wherein the sectors are symmetrically arranged with respect to a center of the optical resonator.

9. The device as in claim 1, wherein the sectors are parallel stripes across the optical resonator.

10. The device as in claim 9, wherein the parallel stripes have substantially identical stripe widths.

11. The device as in claim 9, wherein the parallel stripes have stripe widths that change with distances between a center of the optical resonator and the parallel stripes.

12. The device as in claim 1, wherein the sectors comprise two adjacent oppositely poled sectors along a direction around which the whispering gallery modes circulate.

13. The device as in claim 1, wherein the sectors are made of $LiNbO_3$ or $LiTaO_3$.

14. The device as in claim 1, wherein the electrical oscillation signal has a frequency that is substantially equal to a free spectral range of the optical resonator.

15. The device as in claim 1, wherein the optical resonator has a geometry to yield nonequidistant modes and wherein the electrical oscillation signal has a frequency that is substantially resonant with two different modes of the optical resonator.

16. The device as in claim 15, wherein the optical resonator has a spheriodal shape.

17. The device as in claim 1, further comprising an optical coupler located relative to the optical resonator and operable to couple an input signal into one mode of the optical resonator and to couple an output signal in another mode of the optical resonator, wherein the output signal is modulated at a frequency of the electrical oscillation signal.

18. A method, comprising:
   using an optical resonator to receive an input optical signal, wherein the optical resonator has a geometry to support whispering gallery modes and comprises a plurality of sectors whose nonlinear coefficients are oppositely poled between two adjacent sectors, wherein the sectors each exhibit an electro-optical effect; and coupling an electrical oscillation signal into the optical resonator to spatially overlap with the whispering gallery modes and to produce an output optical signal having a modulation at a frequency of the electrical oscillation signal.

19. The method as in claim 18, wherein the sectors are symmetrically arranged with respect to a center of the optical resonator.

20. The method as in claim 18, wherein the sectors are parallel stripes across the optical resonator.

21. The method as in claim 18, wherein the electrical oscillation signal has a frequency that is substantially equal to a free spectral range of the optical resonator.

22. The method as in claim 18, wherein the optical resonator has a geometry to yield nonequidistant modes and wherein the electrical oscillation signal has a frequency that is substantially resonant with two different modes of the optical resonator.

23. The method as in claim 18, further comprising controlling a frequency of the electrical oscillation signal to be substantially equal to a free spectrum of the optical resonator to operate the optical resonator in a running wave electro-optical resonator.

24. The method as in claim 1, wherein the optical resonator has a geometry to yield nonequidistant modes, and the method further comprising:
controlling the electrical oscillation signal at a frequency that is substantially resonant with two different modes of the optical resonator to produce a single sideband modulation.

25. A device, comprising:
an optical resonator configured to support whispering gallery modes and comprising a nonlinear optical material exhibiting a second-order nonlinear effect and an electro-optical effect, wherein the nonlinear optical material comprises a plurality of sectors arranged in a quasi phase matching configuration for nonlinear wave mixing of an input optical signal in a first whispering gallery mode, an output optical signal in a second whispering gallery mode, and an electrical oscillation signal spatially overlapping with the whispering gallery modes;
an electrical waveguide located relative to the optical resonator to guide the electrical oscillation signal into the optical resonator to spatially overlap with the whispering gallery modes and to modulate an index of the optical resonator; and
means for coupling the input optical signal into the optical resonator and the output optical signal out of the resonator.

26. The device as in claim 25, wherein the optical resonator includes at least a portion of a sphere.

27. The device as in claim 25, wherein the optical resonator has a non-spherical shape.

28. The device as in claim 25, wherein the sectors are symmetrically arranged with respect to a center of the optical resonator.

29. The device as in claim 25, wherein the sectors are parallel stripes across the optical resonator.

30. The device as in claim 25, wherein the coupling means comprises a single optical coupler.

31. The device as in claim 25, wherein the coupling means comprises an input optical coupler and an output optical coupler.

* * * * *